United States Patent [19]

Dushkes et al.

[11] Patent Number: 4,777,549
[45] Date of Patent: Oct. 11, 1988

[54] SPINDLE FILTER IN A DATA RECORDING DISK FILE

[75] Inventors: Sherman Z. Dushkes, Redwood City; Dennis K. Lieu, San Jose, both of Calif.

[73] Assignee: International Business Machines Corporation, Armonk, N.Y.

[21] Appl. No.: 918,183

[22] Filed: Oct. 14, 1986

[51] Int. Cl.$^4$ .................... G11B 5/012; G11B 33/14; B01D 46/10

[52] U.S. Cl. ........................ 360/97; 360/98; 310/90; 384/476; 384/624; 55/503; 55/510; 55/385.1

[58] Field of Search ............. 384/317, 320, 321, 473, 384/476, 624; 369/269, 270, 258; 310/56, 90; 55/385 R, 503, 510; 417/406, 407; 360/86, 97–99, 133

[56] References Cited

U.S. PATENT DOCUMENTS

| 2,057,196 | 10/1936 | Koch | 310/56 |
|---|---|---|---|
| 2,691,554 | 10/1954 | Bucher | 384/320 |
| 2,702,093 | 2/1955 | Sherril | 417/407 |
| 3,004,806 | 10/1961 | Schinnerer | 417/407 |
| 4,308,041 | 12/1981 | Ellis et al. | 55/510 |

FOREIGN PATENT DOCUMENTS

| 60-136985 | 7/1985 | Japan | 360/97 |
|---|---|---|---|
| 60-261091 | 12/1985 | Japan | 360/97 |
| 61-90382 | 5/1986 | Japan | 369/270 |

OTHER PUBLICATIONS

R. A. Davis, et al., "Air Circulation System," IBM Technical Disclosure Bulletin, vol. 24, No. 11B, (Apr. 1982), p. 6198.
R. A. Davis et al., "Spindle Seal for Self-Pressurized Head/Disk Assembly," IBM Technical Disclosure Bulletin, vol. 26, No. 11, (Apr. 1984), p. 6001.
SEALOL, High Performance Mechanical Face Seals, (Bulletin 700B2) Brochure.
J. H. Willaman, "Air Sealing Device for Rotating Shafts or Hubs," IBM Technical Disclosure Bulletin, vol. 19, No. 1, (Jun. 1976), p. 249.
V. J. Trotter, Jr., "Plastic Rigid Seal to Trap Airborne Submicron Particles," IBM Technical Disclosure Bulletin, vol. 19, No. 4, (Sep. 1976), p. 1392.
R. C. Treseder, "Axial Gap Seal for Rotating Shaft," IBM Technical Disclosure Bulletin, vol. 22, No. 2, (Jul. 1979), pp. 776–777.

Primary Examiner—Stuart N. Hecker
Assistant Examiner—Benjamin E. Urcia
Attorney, Agent, or Firm—Thomas R. Berthold

[57] ABSTRACT

A filtering means is provided in a data recording disk file for filtering air flowing from the region of the spindle bearings into the head/disk area of the disk file. The filtering means is mounted to the disk file frame adjacent the rotary shaft of the spindle and together with the shaft defines a narrow annular gap for the flow of a very small portion of the total air flow from the region surrounding the spindle bearings. The filtering means includes first and second ring members which have axially-directed openings and which together support filter material located between the ring members. The primary portion of the air flow from the spindle bearings passes through the axially-directed openings of the ring members and the filter material and is thus filtered before entering the head/disk area. The filtering means also serves as a make-up filter for those generally sealed disk files in which the rotating disks serve as a pumping means for recirculating air within the head/disk area and in which the region surrounding the drive motor is open to the atmosphere.

4 Claims, 2 Drawing Sheets

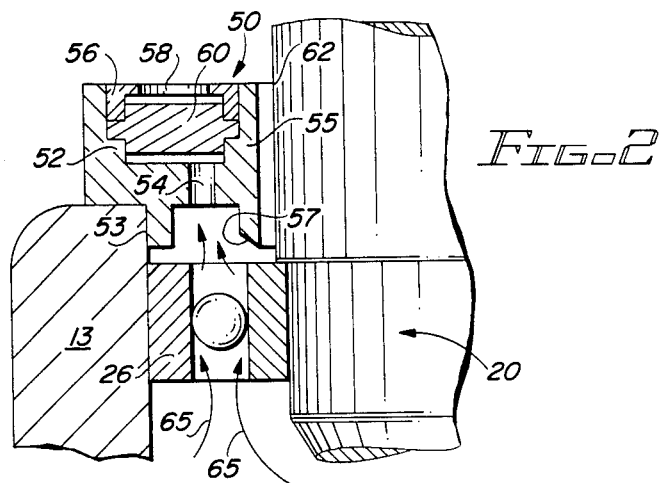
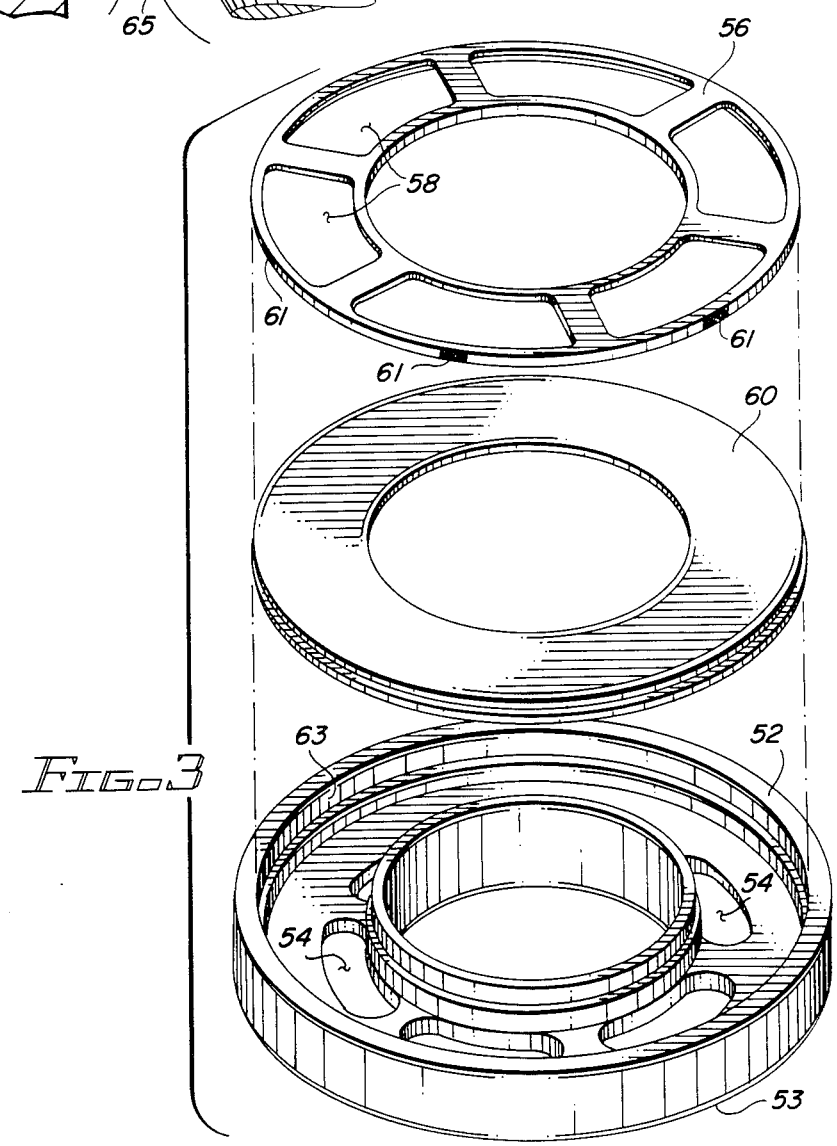

SPINDLE FILTER IN A DATA RECORDING DISK FILE

BACKGROUND OF THE INVENTION

1. Technical Field

This invention relates to data recording disk files which have a generally sealed enclosure for the read/write heads and the data recording disks, and in particular to a filter for preventing contaminants from entering the sealed enclosure through the disk file spindle.

2. Description of the Prior Art

Conventional magnetic recording disk files have one or more rotatable data disks which are accessed by read/write heads which are supported on a thin cushion of air between the heads and the rotating disks. The disks are mounted for rotation on a spindle, which includes a rotatable shaft, a bearing assembly supporting the shaft to the disk file frame, and a hub located at the end of the shaft. Because of the extremely low flying height of the heads, particulate matter entering the head/disk area can cause the heads to crash, thereby damaging the heads and disks.

Certain disk files operate as generally sealed enclosure, as contrasted with those disk files which force filtered outside air at a relatively high flow rate through the head/disk area. In these sealed disk files, the rotating disks serve as the air pump to continually recirculate air within the generally sealed enclosure. A make-up filter is required to permit air to enter the sealed enclosure at an extremely low flow rate, since some air does escape from the enclosure during normal operation. Air may also escape the enclosure through the spindle bearings since the pumping action of the disks generates a low-pressure area near the hub at the end of the spindle. The spindle bearings are a primary source of contaminants.

In order to prevent particulate matter from passing the spindle bearings into the head/disk area, conventional types of seals are used. These include ferrofluidic and labyrinth seals. Ferrofluidic seals are costly and difficult to assemble and repair. Labyrinth seals merely provide a flow impedance for air flowing past the bearings and do not filter out small particulate matter.

SUMMARY OF THE INVENTION

The present invention is a filtering means located between the spindle shaft and the disk file frame. The filtering means comprises a ring assembly which is secured to the frame and has a plurality of axially-directed openings for the air flowing from the region between the shaft and frame where the spindle bearings are located. The inner circumference of the ring assembly is located in close proximity to the outer surface of the shaft near the end of the shaft to which the hub is attached. Suitable filter material is supported in the ring assembly in alignment with the axially-directed openings so that a substantial portion of air flowing past the bearings passes through the filter material. A much lesser portion of the air passes through the annular gap defined by the inner circumference of the ring assembly and the outer surface of the shaft.

In those disk files in which the spindle drive motor is not enclosed in a sealed chamber, but exposed to the atmosphere, the filtering means also serve as the disk file make-up filter, thereby eliminating the necessity of a separte make-up filter. In this embodiment, the filtering means filters contaminants from the atmosphere as well as contaminants from the spindle bearings.

For a fuller understanding of the nature and advantages of the present invention, reference should be made to the following detailed description taken in conjunction with the accompanying drawings.

DESCRIPTION OF THE DRAWINGS

FIG. 2 is an enlarged view of a portion of FIG. 1 illustrating the arrangement of the filter ring assembly relative to the disk file frame and the spindle shaft; and FIG. 3 is an isometric view of the two ring members and the intermediate filter material which together form the filtering means.

DESCRIPTION OF THE PREFERRED EMBODIMENTS

Figure 1:
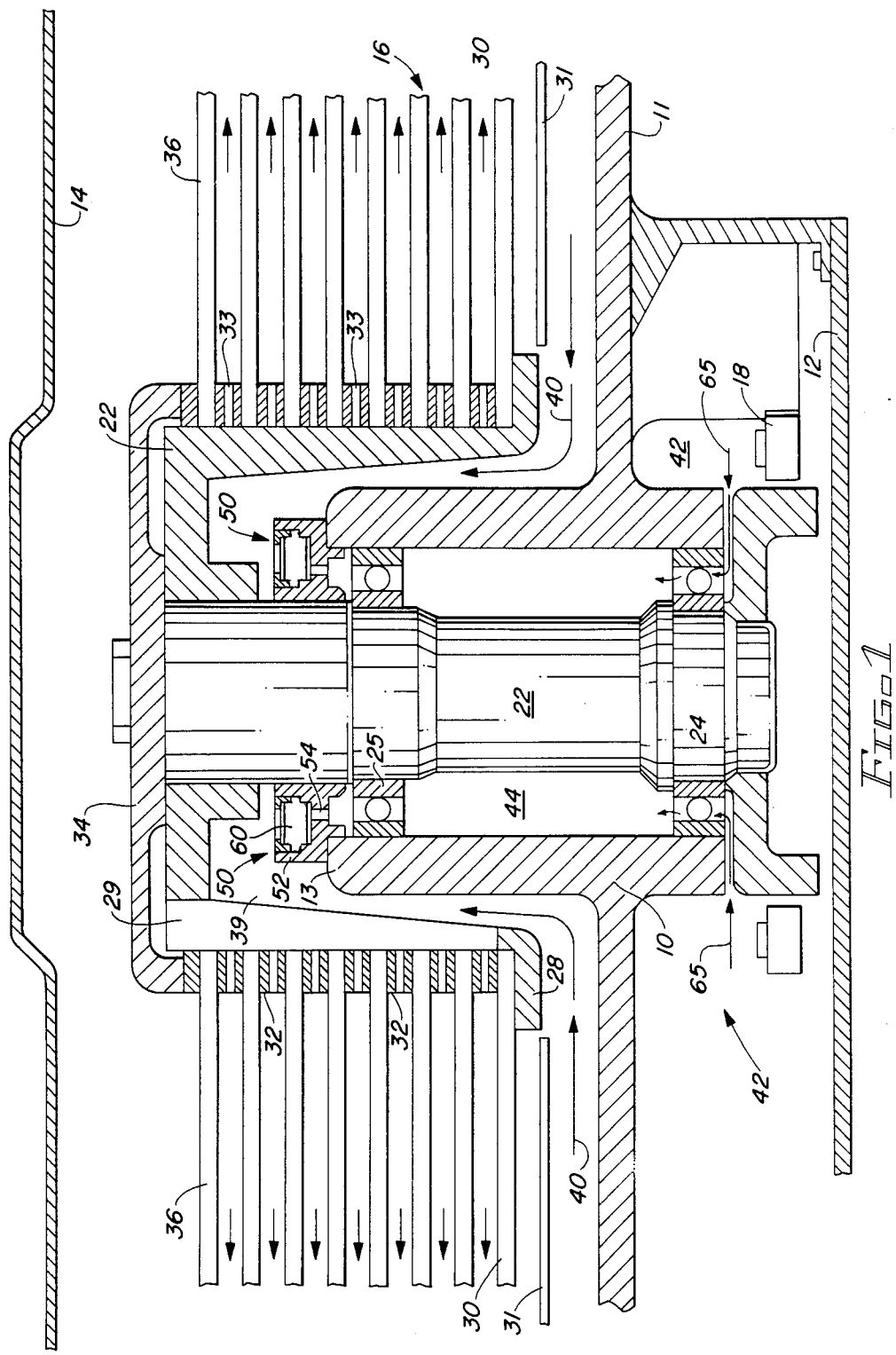
FIG. 1 is a sectional view of a portion of a disk file illustrating the spindle motor, shaft with attached hub, and bearings.

A cross-section of a portion of the disk file incorporating the present invention is illustrated in FIG. 1. The disk file includes a frame 10 having a base plate 11 and a cylindrical portion 13. A compartment cover 12 and an end cover 14 are attached to frame 10. The region depicted as 16, and located generally between the cover 14 and base plate 11, is the generally sealed head-disk area which contains the magnetic disks and read/write heads.

A spindle drive motor 18 drives a rotary shaft 20 which has a hub 22 attached to its end opposite motor 18. The shaft 20 is attached to portion 13 of frame 10 by axially-spaced bearings 24, 26.

The hub 22 has a lower rim 28 which supports the lowermost disk 30 in the stack of magnetic recording disks. Each of the disks on hub 22 is separated from adjacent disks by means of disk spacers 32. An axial load is applied to all of the disks in the disk stack by means of a disk clamp 34 which is attached to the end of shaft 20.

The hub 22 has a plurality of circumferentially-spaced and axially-directed slots 29 which provide means for the passage of air from the region 39 between hub 22 and frame portion 13 to the disk spacers 32. The slots 29 in the hub communicate with circumferentially-spaced openings 33 in the disk spacers 32. In operation of the disk file, the rotating disks serve as the means for pumping the air which is generally confined within the head-disk area 16. The air is circulated in the direction shown by arrow 40 from below the baffle 31 which is located below the lowermost disk 30, up between hub 22 and frame portion 13, and out through the slots 29 in the hub 22 and openings 33 in disk spacers 32. A filter (not shown) is typically located in the disk file for filtering any particles flowing within the area 16.

In certain disk files, the region 42 where the spindle motor 18 is located, i.e. between base plate 11 and compartment cover 12, is not part of the sealed enclosure but is generally open to the atmosphere. Because the bearings 24, 26 do not provide an air-tight seal, during operation of the disk file the generally low-pressure area in region 39 causes air to flow from the atmosphere past bearing 24 and into the region 44 between shaft 20 and frame portion 13. The filtering means 50 shown in FIG. 1 between bearings 26 and region 39 acts to substantially seal the motor 18 and the spindle bearings for the head/disk area 16 and to filter any particulate matter which would otherwise pass into region 39.

The filtering means 50, as shown in better detail in the enlarged view of FIG. 2, includes a lower ring 52 having axially-directed openings 54, an upper ring 56 with axially-directed openings 58, and annular filter material 60 located between rings 52 and 56. The lower ring has a radially outer wall 53 which provides an interference fit with frame portion 13 and a radially inner wall 55 which, together with the outer surface of shaft 20, defines an annular gap 62 between the filtering means 50 and the shaft 20. The ring 52 also includes an annular sloped face 57 which slopes toward openings 54 and thus directs the flow of air into openings 54.

The three compartments forming the filtering means 50 are shown in the isometric view of FIG. 3. The first or lower ring 52 has a plurality of circularly-spaced slots which are the axially-directed openings 54 for the flow of air from the spindle bearings. An annular sheet of filter material 60, such as conventional glass fiber material available from Cambridge Filter Corporation or Filtrete brand filter material from 3M Corporation, is seated within the ring 52 over the openings 54. The second or top ring 56 has a like plurality of circularly-spaced, axially-directed openings 58 and is placed over filter material 60 into alignment with lower ring 52. The lower ring 52 is preferably formed of stainless steel and the upper ring 56 is preferably formed of a plastic material, such as polycarbonate. The two rings are held together to retain filter material 60 between them by means of the tabs 61 on ring 56 which snap into the inner lip 63 on ring 52.

Referring again to FIG. 1, when the disk first begin rotating, a pressure less than atmospheric occurs in region 39 by virtue of the pumping action of the rotating disks. Since the bearings 24, 26 do not provide a perfect seal, atomospheric air enters into region 44, in the direction indicated by arrow 65, past bearing 24. This air flow carries with it particulate matter, such as bearing grease and other contaminants, which could cause damage to the heads or disks. However, after this contaminated air passes bearing 26, where further contamination can also occur, a substantial portion of it is directed through openings 54 in ring 52, through fiber material 60, and out openings 58 in top ring 56. An insubstantial portion, typically less than 1% of the air from region 44 is directed through the annular gap 62 between shaft 20 and the filtering means 50. Thus, with the use of the filtering means 50 in those disk files in which the motor 18 is not within a sealed enclosure, it is not necessary to use a separate make-up filter since the filtering means 50 serves this function. However, in those disk files in which the region 42 surrounding motor 18 is a substantially sealed chamber, a separate make-up filter in base plate 11 is provided to communicate between region 16 and the atmosphere. In that instance, the filtering means 50 functions in the same manner, the primary difference being that air flow passes through the spindle bearings generally only at start-up of the disk file, since after start-up there is generally pressure equilization between regions 39 and 42, with the primary air flow being through the make-up filter.

While the preferred embodiments of the present invention have been illustrated in detail, it should be apparent that modifications and adaptations in those embodiments may occur to one skilled in the art without departing from the scrope of the present invention as set forth in the following claims.

What is claimed is:

1. In a data recording disk file of the type having a frame, a disk drive motor, a rotary shaft driven by the drive motor and attached to the frame by at least two axially-spaced bearings, a hub attached to an end of the shaft, at least one disk attached to the hub, and a cover providing, together with the frame, a generally sealed enclosure for the disk file, wherein air flows generally in the shaft's axial direction through the bearings toward the hub, an improvement comprising:

a ring secured to the frame downstream of the bearings adjacent to the hub end of the shaft and having an opening axially aligned with the bearings, the radially inner wall of the ring being concentric with and spaced from the shaft so as to define a relatively narrow annular gap; and filter material supported by the ring and located within the opening for filtering the air flowing through the bearings, whereby during operation of the disk file a substantial portion of the air flowing through the bearings passes through the filter material and a substantially lesser portion passes through the annular gap.

2. The improvement according to claim 1, wherein the disk files is of the type having the drive motor retained within a generally sealed chamber and a breather filter providing for air flow from the atmosphere into the disk file enclosure.

3. The improvement according to claim 1, wherein the ring further comprises a first ring member secured to the frame and having a plurality of circumferentially-spaced, axially-directed openings, a second ring member secured to the first ring and having a plurality of circumferentially-spaced, axially-directed openings, and wherein the filter material is located between the first and second rings and aligned with the openings in the rings, whereby air passing through the bearings is directed through the filter material.

4. The improvement according to claim 3, wherein the first ring member includes means for directing air from the bearings to the openings in the first ring member.

* * * * *